United States Patent
Fernandez-Galindo et al.

(10) Patent No.: US 11,075,422 B2
(45) Date of Patent: Jul. 27, 2021

(54) BATTERY TERMINAL COVERING ASSEMBLY AND TERMINAL COVERING METHOD

(71) Applicant: Ford Global Technologies, LLC, Dearborn, MI (US)

(72) Inventors: Francisco Fernandez-Galindo, Canton, MI (US); Daniel Paul Roberts, Livonia, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 181 days.

(21) Appl. No.: 16/542,686

(22) Filed: Aug. 16, 2019

(65) Prior Publication Data

US 2021/0050563 A1    Feb. 18, 2021

(51) Int. Cl.
*H01M 4/02* (2006.01)
*H01M 50/147* (2021.01)
*H01M 50/20* (2021.01)
*H01M 50/502* (2021.01)
*H01M 50/543* (2021.01)

(52) U.S. Cl.
CPC ......... *H01M 50/147* (2021.01); *H01M 50/20* (2021.01); *H01M 50/502* (2021.01); *H01M 50/543* (2021.01); *H01M 2220/20* (2013.01)

(58) Field of Classification Search
CPC ...................................................... H01M 4/02
See application file for complete search history.

(56) References Cited

U.S. PATENT DOCUMENTS

| | | | |
|---|---|---|---|
| 8,933,338 B2 | 1/2015 | Ikeda et al. | |
| 9,246,146 B2 | 1/2016 | Kim et al. | |
| 10,020,486 B2 | 7/2018 | Eom et al. | |
| 2001/0044241 A1* | 11/2001 | Saito | H01M 50/502 439/736 |

FOREIGN PATENT DOCUMENTS

| | | |
|---|---|---|
| CN | 108172708 | 6/2018 |
| KR | 101808307 | 12/2015 |

* cited by examiner

*Primary Examiner* — Jacob B Marks
(74) *Attorney, Agent, or Firm* — David Kelley, Esq.; Carlson, Gaskey & Olds, P.C.

(57) ABSTRACT

A covering assembly for a traction battery includes, among other things, a busbar cover that covers a busbar of a battery array, and a terminal cover connected to the busbar cover and moveable back and forth between a closed position and an open position. The terminal cover and cover at least one terminal of the battery array when in the closed position.

17 Claims, 8 Drawing Sheets

BATTERY TERMINAL COVERING ASSEMBLY AND TERMINAL COVERING METHOD

TECHNICAL FIELD

This disclosure relates generally to covering a terminal of a battery array and, more particularly, to a terminal cover that is connected to a busbar cover.

BACKGROUND

Electrified vehicles differ from conventional motor vehicles because electrified vehicles are selectively driven using one or more electric machines powered by a traction battery. The traction battery can include individual battery arrays having terminals that electrically connect the battery arrays to other arrays or other components. The terminals can require protection when the battery arrays are shipped and when the battery arrays are installed within the traction battery.

SUMMARY

A covering assembly for a traction battery according to an exemplary aspect of the present disclosure includes, among other things, a busbar cover that covers a busbar of a battery array, and a terminal cover connected to the busbar cover. The terminal cover is moveable back and forth between a closed position and an open position. The terminal cover covers a terminal of the battery array when in the closed position.

Another example of the foregoing covering assembly includes a living hinge connecting the terminal cover to the busbar cover.

Another example of any of the foregoing covering assemblies includes a retention assembly that holds the terminal cover in the closed position.

In another example of any of the foregoing covering assemblies, the retention assembly includes a first portion on the terminal cover that engages a second portion on a frame of a battery cell to hold the terminal cover in the closed position.

In another example of any of the foregoing covering assemblies, the retention assembly includes a first portion on the terminal cover that engages a second portion on an interconnect board to hold the terminal cover in the closed position.

Another example of any of the foregoing covering assemblies includes a retention assembly that engages to hold the terminal cover in the open position. The retention assembly includes a first portion on the terminal cover and a second portion on the busbar cover.

In another example of any of the foregoing covering assemblies, the busbar cover and the terminal cover are portions of a single monolithic structure.

In another example of any of the foregoing covering assemblies, the busbar cover and the terminal cover are portions of a covering assembly that is clipped to a battery array to cover portions of an interconnect board.

In another example of any of the foregoing covering assemblies, the busbar cover is clipped to a battery array to hold the busbar cover in a position where the busbar cover covers the busbar.

In another example of any of the foregoing covering assemblies, the terminal cover is moveable between the closed position and the open position while the busbar cover is covering the busbar of the battery array.

Another example of any of the foregoing covering assemblies includes an electrical connector that extends through an aperture between the terminal cover and the busbar cover when the terminal cover is in the closed position. The electrical connector electrically connects the terminal of the battery array to a terminal of another battery array.

In another example of any of the foregoing covering assemblies, the terminal cover is a first terminal cover and the terminal is a positive terminal. The assembly further includes a second terminal cover that is connected to the busbar cover and is moveable back and forth between a closed position and an open position. The second terminal cover covers a negative terminal of the battery array when in the closed position.

A covering assembly according to another exemplary aspect of the present disclosure includes, among other things, a busbar cover that is secured to a battery array to cover at least one busbar, a plurality of battery cell terminals that are coupled to the at least one busbar, and a positive terminal cover moveable back and forth between a closed position and an open position. The positive terminal cover covers a positive terminal of the battery array when in the closed position. A negative terminal cover is moveable back and forth between a closed position and an open position. The negative terminal cover covers a negative terminal of the battery array when in the closed position.

Another example of the foregoing covering assembly includes a retention assembly that holds the positive terminal cover in the closed position, and another retention assembly that holds the positive terminal cover in the open position.

A terminal covering method according to yet another exemplary aspect of the present disclosure includes attaching a busbar cover to a battery array, electrically connecting an electrical connector to a terminal of the battery array, and moving a terminal cover from an open position to a closed position where the terminal cover covers the terminal. The busbar cover is connected to the terminal cover.

Another example of the foregoing method includes moving the terminal cover by rotating the terminal cover about a living hinge that connects the terminal cover to the busbar cover.

Another example of any of the foregoing methods includes clipping the busbar cover to the battery array when attaching the busbar cover to the battery array.

Another example of any of the foregoing methods includes holding the terminal cover in the closed position using a retention assembly.

In another example of any of the foregoing methods, the retention assembly includes a first portion on the terminal cover that engages a second portion on a frame of a battery cell to hold the retention assembly in the closed position.

Another example of any of the foregoing methods includes holding the terminal cover in the open position using a first portion of the busbar cover that engages a second portion of the terminal cover.

The embodiments, examples and alternatives of the preceding paragraphs, the claims, or the following description and drawings, including any of their various aspects or respective individual features, may be taken independently or in any combination. Features described in connection with one embodiment are applicable to all embodiments, unless such features are incompatible.

BRIEF DESCRIPTION OF THE FIGURES

The various features and advantages of the disclosed examples will become apparent to those skilled in the art from the detailed description. The figures that accompany the detailed description can be briefly described as follows.

DETAILED DESCRIPTION

This disclosure relates generally to covering a terminal of a battery array. In particular, this disclosure details a covering assembly that includes a terminal cover moveable between an open position and a closed position. The covering assembly additionally includes a busbar cover. Including both the terminal cover and a busbar cover within the covering assembly can reduce part complexity and simplify assembly.

Figure 1:
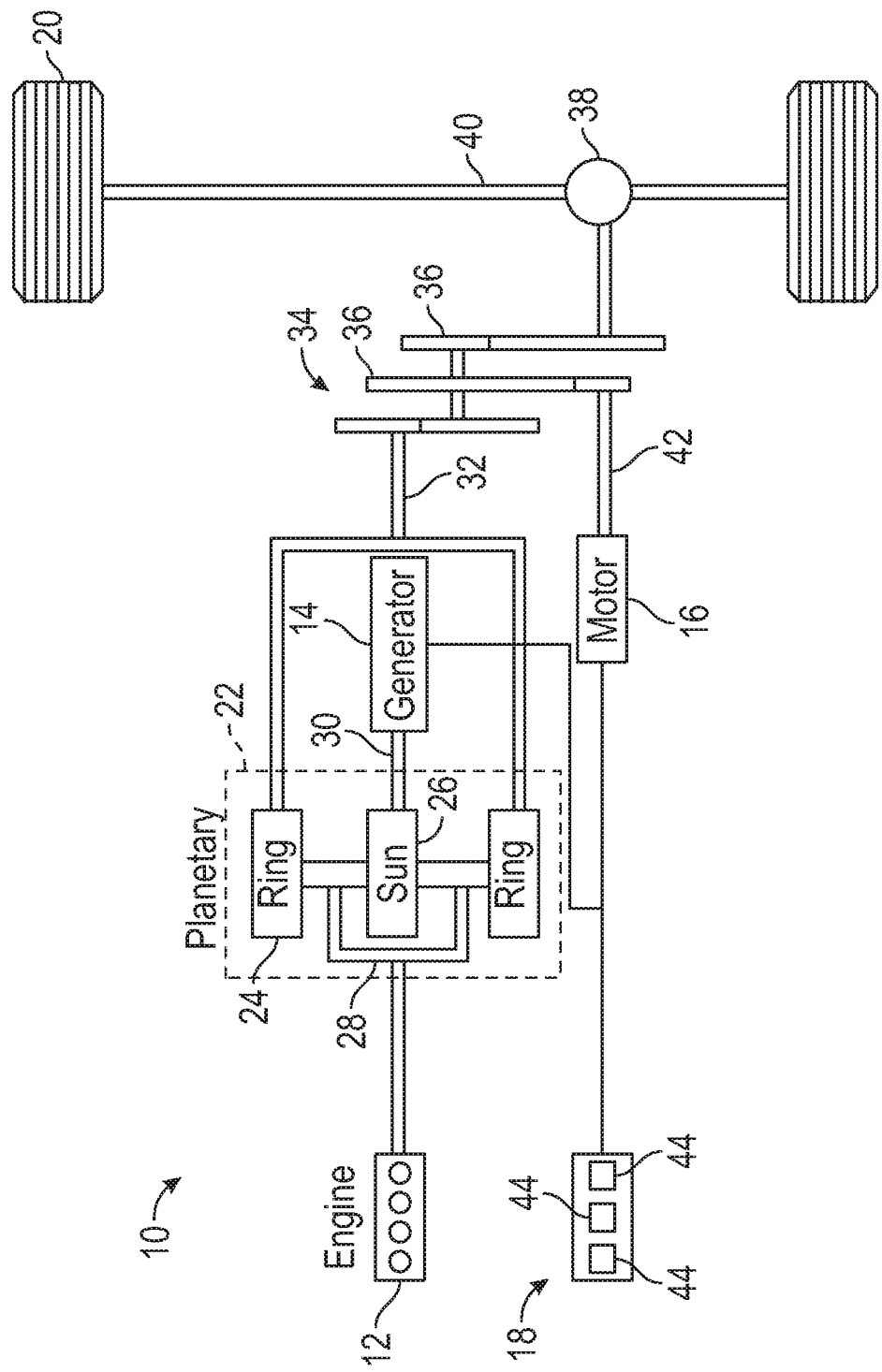
FIG. 1 illustrates a schematic view of a powertrain for an electrified vehicle.

FIG. 1 schematically illustrates a powertrain 10 for an electrified vehicle. Although depicted as a hybrid electrified vehicle (HEV), it should be understood that the concepts described herein are not limited to HEVs and could extend to other electrified vehicles, including, but not limited to, plug-in hybrid electrified vehicles (PHEVs), fuel cell vehicles (FCVs), and battery electrified vehicles (BEVs).

In one embodiment, the powertrain 10 is a powersplit powertrain system that employs a first drive system and a second drive system. The first drive system includes a combination of an engine 12 and a generator 14 (i.e., a first electric machine). The second drive system includes at least a motor 16 (i.e., a second electric machine), the generator 14, and at least one battery pack 18. In this example, the second drive system is considered an electric drive system of the powertrain 10. The first and second drive systems generate torque to drive one or more sets of vehicle drive wheels 20 of the electrified vehicle.

The engine 12, which is an internal combustion engine in this example, and the generator 14 may be connected through a power transfer unit 22. In one non-limiting embodiment, the power transfer unit 22 is a planetary gear set that includes a ring gear 24, a sun gear 26, and a carrier assembly 28. Of course, other types of power transfer units, including other gear sets and transmissions, may be used to connect the engine 12 to the generator 14.

The generator 14 can be driven by engine 12 through the power transfer unit 22 to convert kinetic energy to electrical energy. The generator 14 can alternatively function as a motor to convert electrical energy into kinetic energy, thereby outputting torque to a shaft 30 connected to the power transfer unit 22. Because the generator 14 is operatively connected to the engine 12, the speed of the engine 12 can be controlled by the generator 14.

The ring gear 24 of the power transfer unit 22 may be connected to a shaft 32, which is connected to vehicle drive wheels 20 through a second power transfer unit 34. The second power transfer unit 34 may include a gear set having a plurality of gears 36. Other power transfer units may also be suitable. The gears 36 transfer torque from the engine 12 to a differential 38 to ultimately provide traction to the vehicle drive wheels 20. The differential 38 may include a plurality of gears that enable the transfer of torque to the vehicle drive wheels 20. In this example, the second power transfer unit 34 is mechanically coupled to an axle 40 through the differential 38 to distribute torque to the vehicle drive wheels 20.

The motor 16 (i.e., the second electric machine) can also be employed to drive the vehicle drive wheels 20 by outputting torque to a shaft 42 that is also connected to the second power transfer unit 34. In one embodiment, the motor 16 and the generator 14 cooperate as part of a regenerative braking system in which both the motor 16 and the generator 14 can be employed as motors to output torque. For example, the motor 16 and the generator 14 can each output electrical power to the battery pack 18.

The battery pack 18 is an example type of electrified vehicle battery assembly. The battery pack 18 has the form of a high-voltage battery that is capable of outputting electrical power to operate the motor 16 and the generator 14. The battery pack 18 is a traction battery pack as the battery pack 18 can provides power to drive the vehicle drive wheels 20.

In the exemplary embodiment, the battery pack 18 includes a plurality of battery arrays 44. Each of the battery arrays 44 includes a plurality of individual battery cells.

Figure 2:
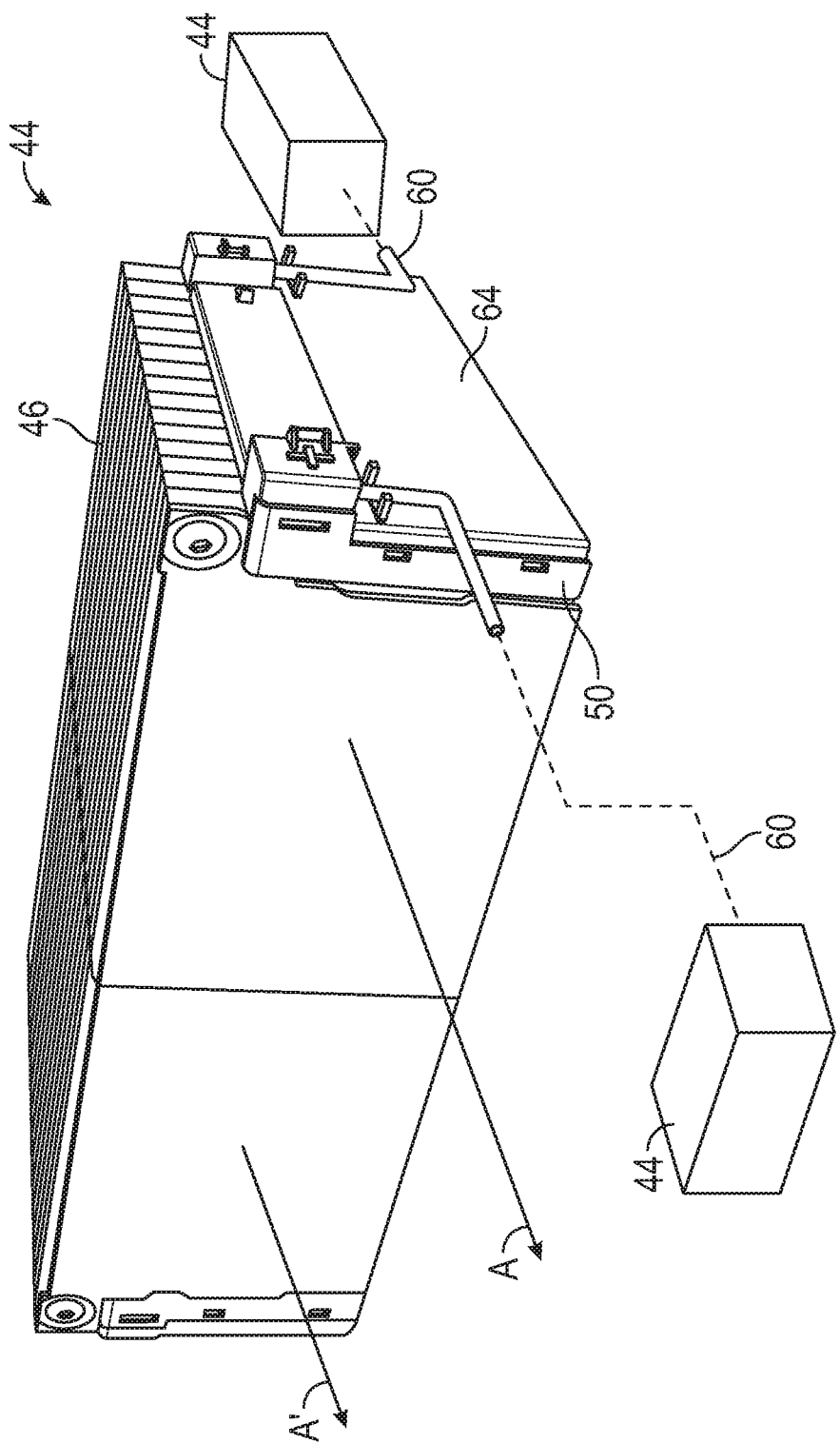
FIG. 2 illustrates a perspective view of an exemplary battery array from the powertrain of FIG. 1.
Figure 3:
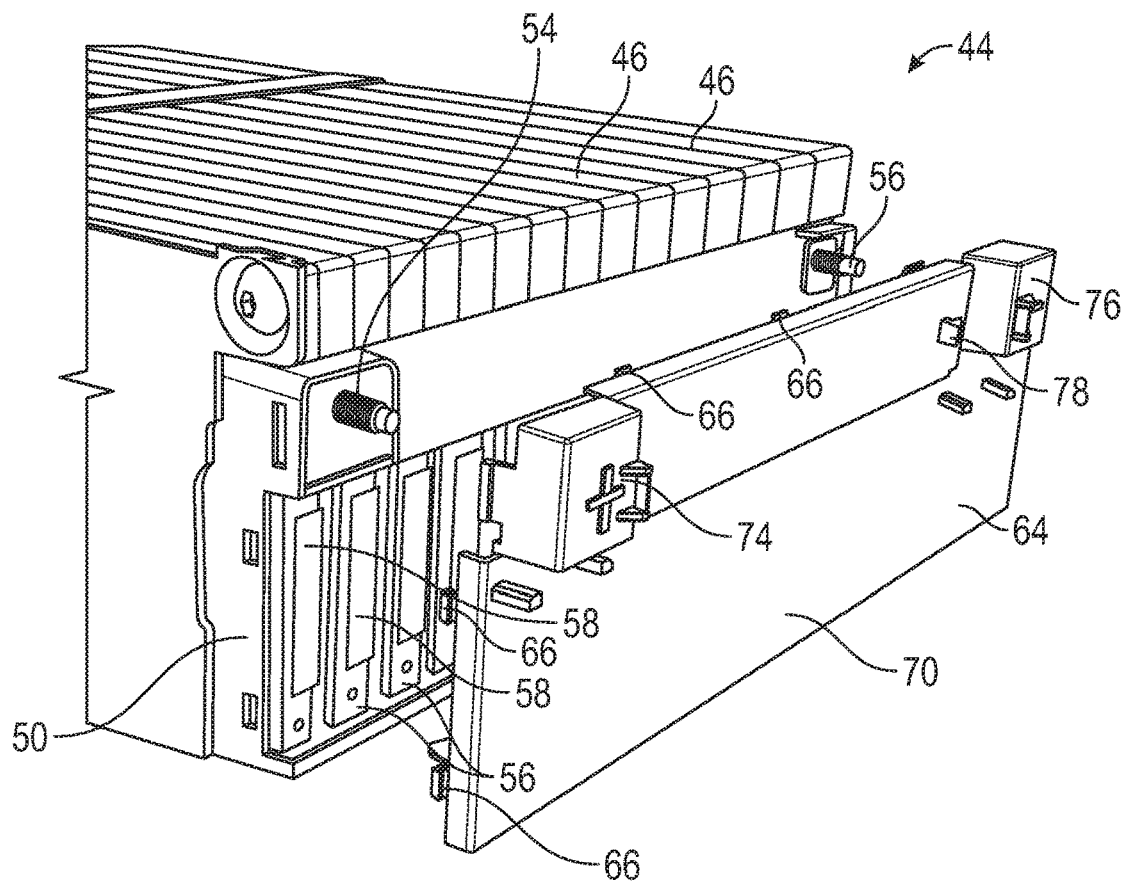
FIG. 3 illustrates a covering assembly of the battery array of FIG. 2 expanded away from other portions of the battery array.

Referring now to FIGS. 2 and 3, one of the battery arrays 44 is shown in perspective being electrically coupled to two other battery arrays 44, which are schematically shown. Generally, each of the battery arrays 44 within the battery pack 18 mimic the battery array 44 that is shown in perspective in FIGS. 2 and 3.

In the exemplary embodiment, the battery array 44 includes a first plurality of battery cells disposed along an axis A, and a second plurality of battery cells disposed along an axis A'. The battery cells, in the exemplary embodiment, are pouch cells each held within a frame 46. The battery cells could be something other than pouch cells in another example, such as prismatic cells.

The battery array 44 includes an interconnect board 50 that is adjacent the first plurality of battery cells. The interconnect board 50 holds a plurality of busbars 52, a positive terminal 54, and a negative terminal 56. Thermoplastic staking can hold the busbars 52, the positive terminal 54, and the negative terminal 56 to the interconnect board 50. Other embodiments could hold the busbars 52, the positive terminal 54, and the negative terminal 56 in some other way. The battery array 44 includes another interconnect board adjacent the second plurality of battery cells.

The first plurality of battery cells include terminal tabs 58 that extend laterally outward through slots in the interconnect board 50. The terminal tabs 58 extend through the slots to electrically connect to the busbars 52. The terminal tabs 58 can be welded to the busbars 52, for example.

The positive terminal 54 and the negative terminal 56 are electrically connected to the busbars 52. Electrical connectors 60 can be connected to the positive terminal 54 and the negative terminal 56. The electrical connectors 60 can electrically connect the battery array 44 to other components of the battery pack 18 or other components of the vehicle. The electrical connectors 60, in the exemplary embodiment, electrically couple together the arrays 44 of the battery pack 18.

The battery array 44 includes a covering assembly 64. The covering assembly 64 is secured to the battery array 44 to cover the busbars 52, the positive terminal 54, the negative terminal 56, and the terminal tabs 58.

In the exemplary embodiment, the covering assembly 64 is a molded, polymer-based component that includes a plurality of clips 66. Some of the clips 66 engage the interconnect board 62 to secure the covering assembly 64 to the battery array 44. Other clips 66 engage the frames 46 to secure the covering assembly 64 to the battery array 44. Although the exemplary embodiment is secured using the clips 66, other examples could secure the covering assembly 64 in other ways, such as by using mechanical fasteners.

The covering assembly 64 includes, among other things, a busbar cover 70, a positive terminal cover 74, and a negative terminal cover 76. In the exemplary embodiment, the positive terminal cover 74 and the negative terminal cover 76 are each connected to the busbar cover 70 via a respective living hinge 78.

Figure 4:
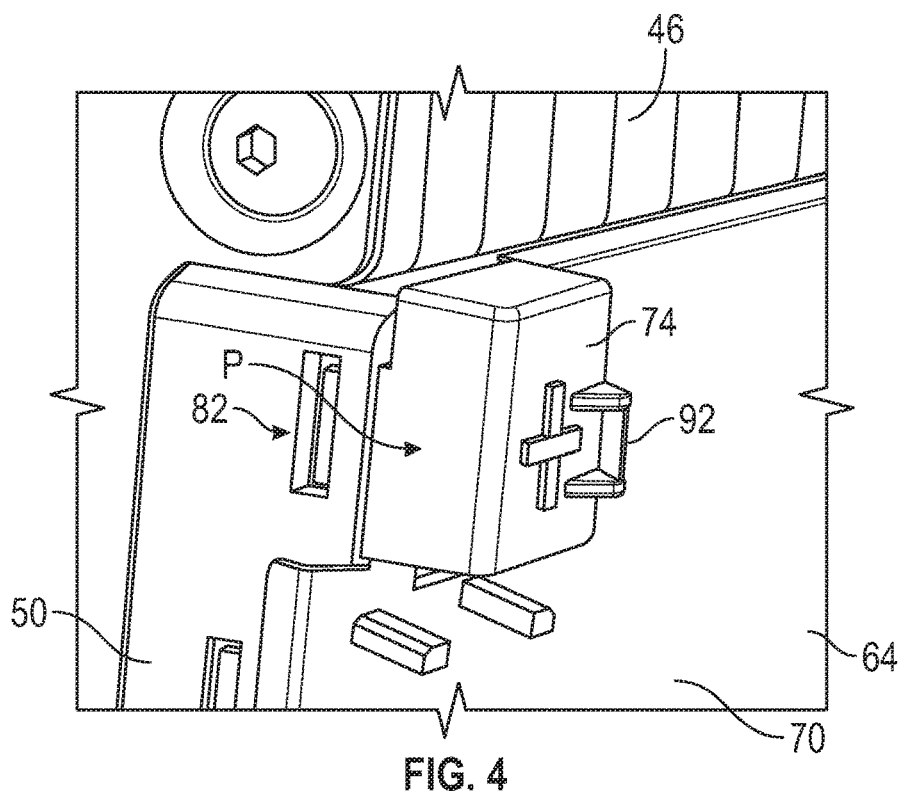
FIG. 4 illustrates a terminal cover of the covering assembly of FIG. 3 in a closed position.
Figure 5:
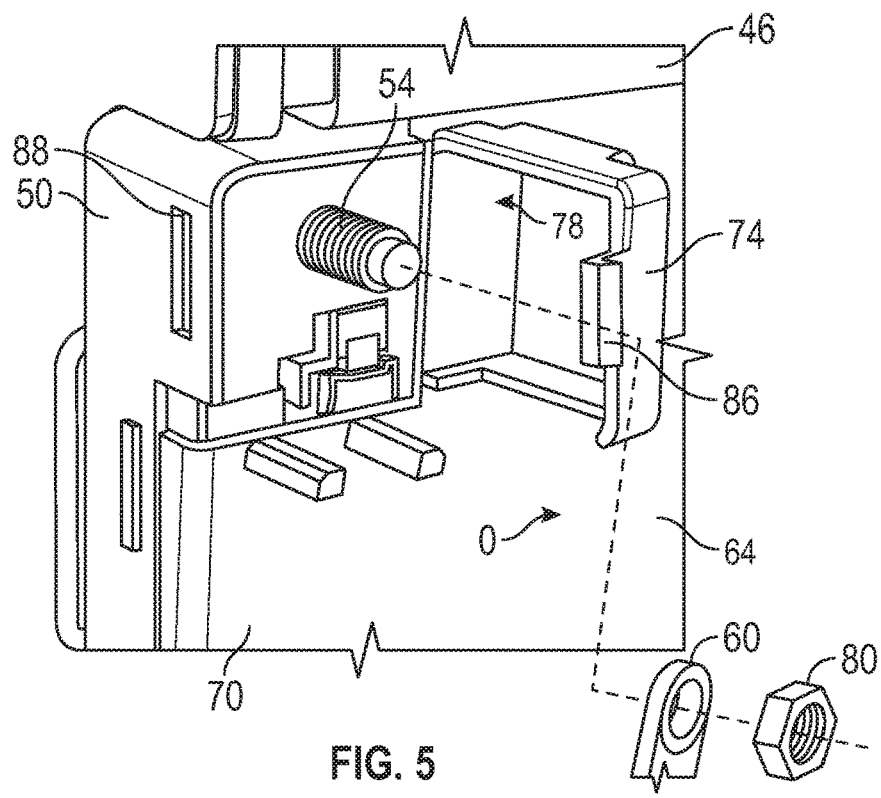
FIG. 5 illustrates the terminal cover of FIG. 4 in an open position.
Figure 6:
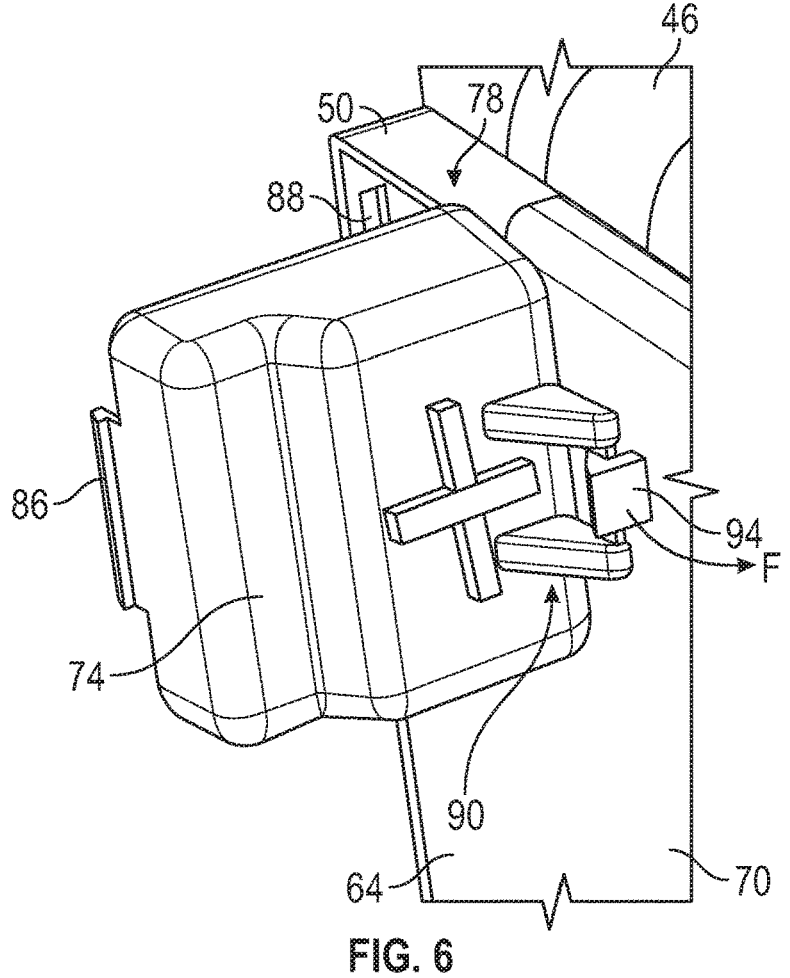
FIG. 6 illustrates another view of the terminal cover of FIG. 4 in an open position.
Figure 7:
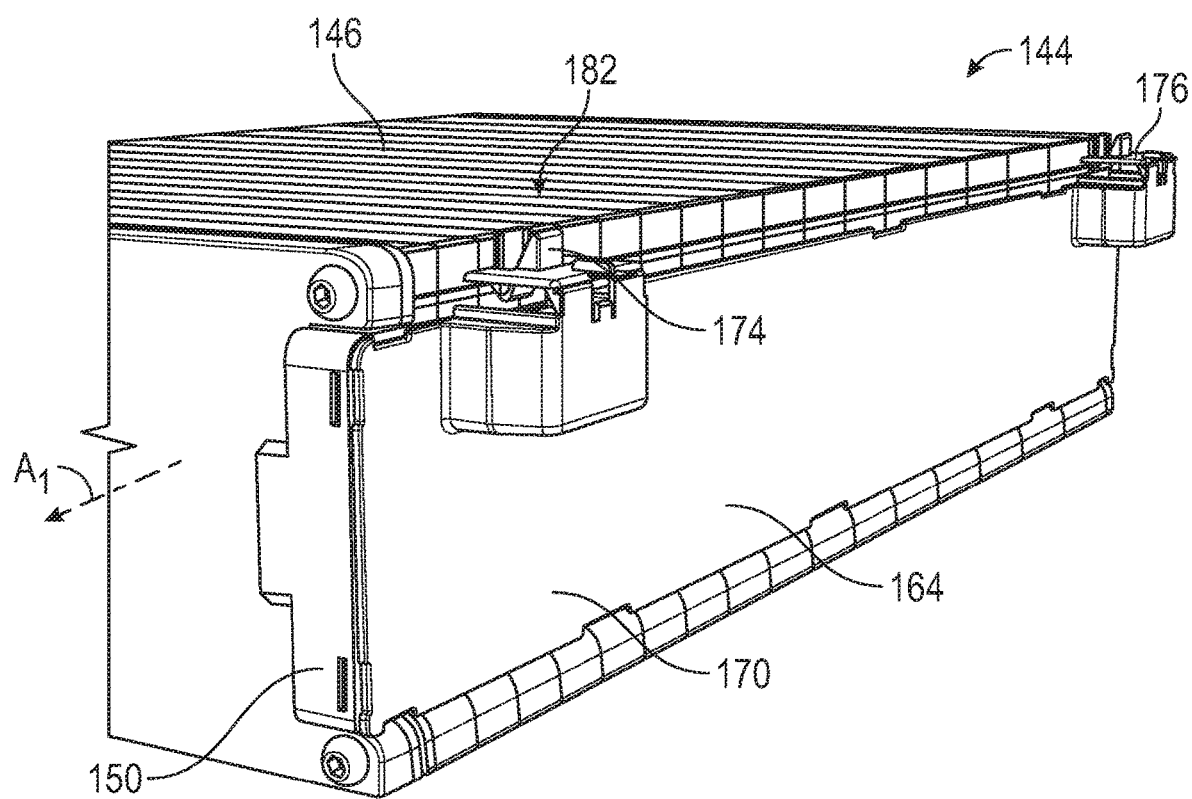
FIG. 7 illustrates a perspective view of a battery array from the powertrain of FIG. 1 according to another exemplary embodiment.
Figure 8:
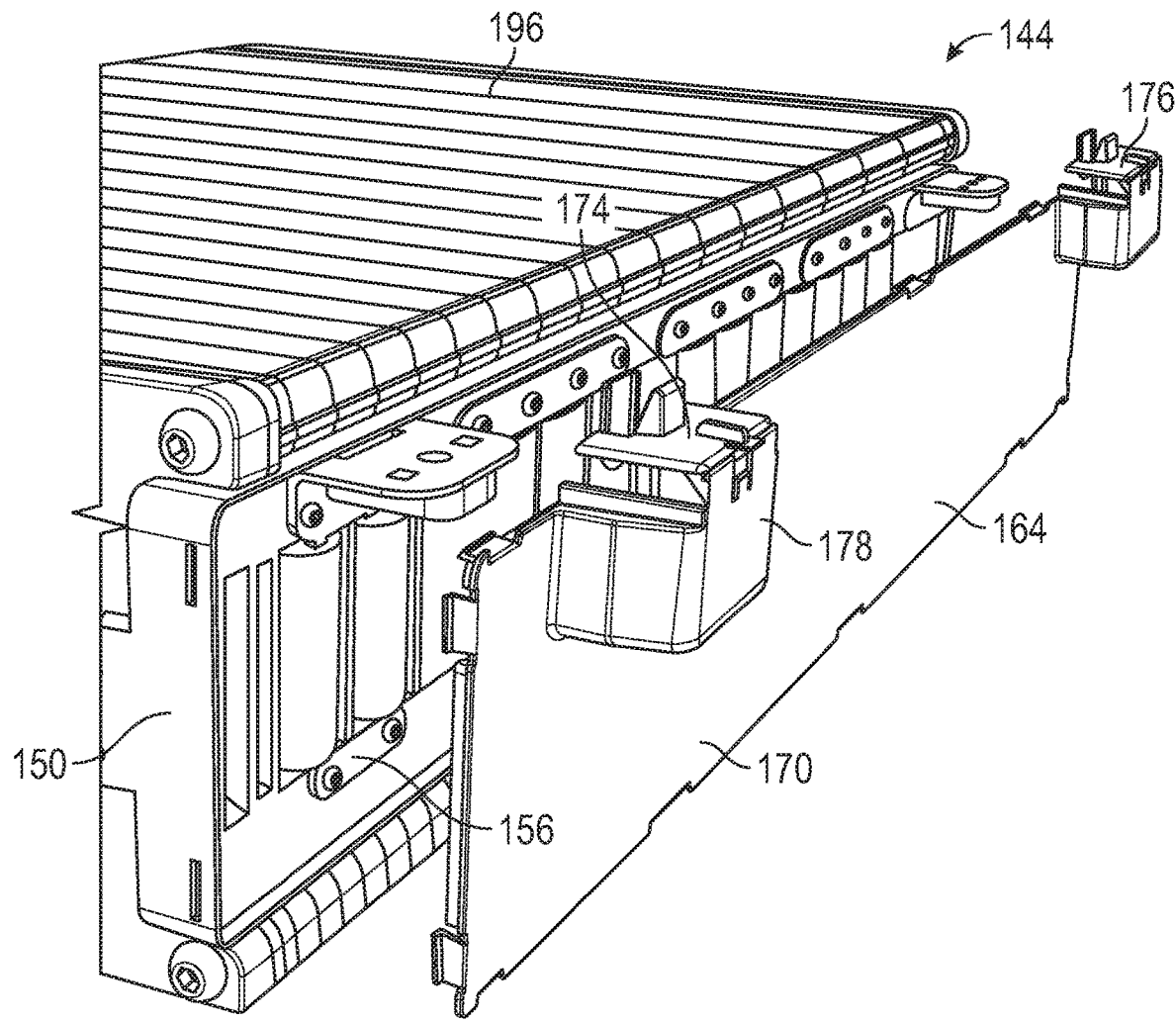
FIG. 8 illustrates a covering assembly of the battery array of FIG. 7 expanded away from other portions of the battery array.
Figure 9:
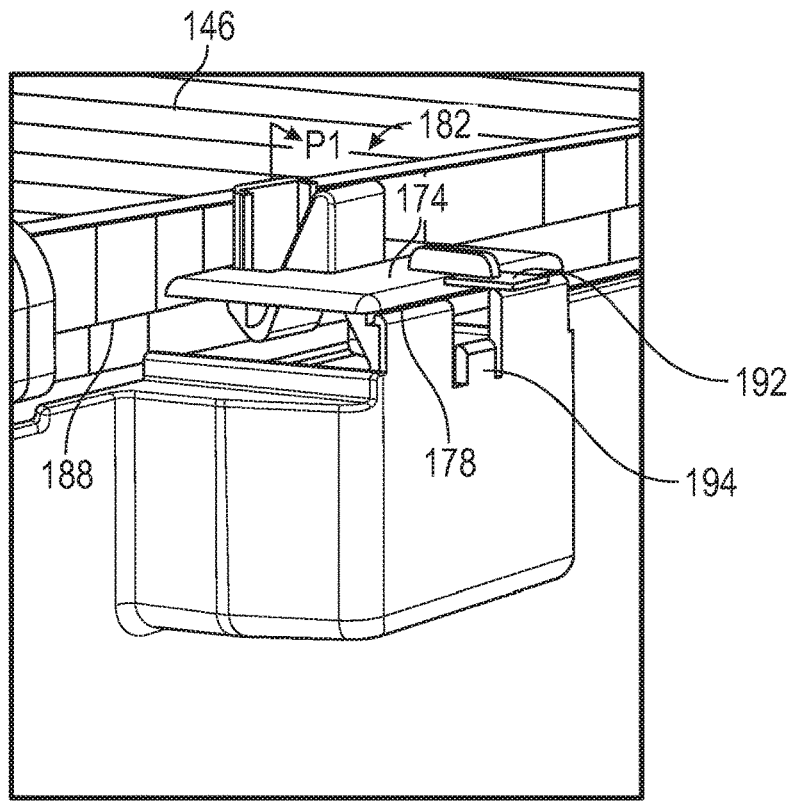
FIG. 9 illustrates a terminal cover of the covering assembly of FIG. 8 in a closed position.
Figure 10:
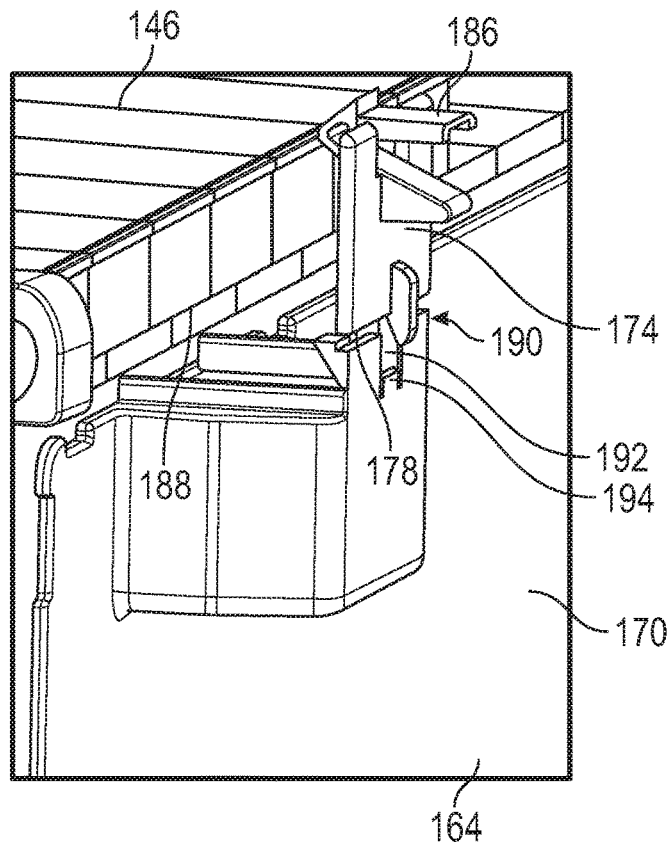
FIG. 10 illustrates the terminal cover of FIG. 9 in an open position.

When the covering assembly 64 is secured to the battery array 44, the positive terminal cover 74 can be moved back and forth between the closed position of FIG. 4 and the open position of FIGS. 5 and 6. The living hinge 78 permits this pivoting movement of the positive terminal cover 74. In the open position, the positive terminal 54 can be accessed. Accessing the positive terminal 54 can be required to secure the electrical connector 60, which, in the exemplary embodiment, is secured to the positive terminal 54 using a threaded nut 80.

In the closed position, the positive terminal cover 74 covers the positive terminal 54, which can be required for finger proofing. The positive terminal cover 74 can be in the closed position when the battery array 44 is shipped to an assembly location and when the battery array 44 is installed within a vehicle. When the positive terminal cover 74 is in the closed position of FIG. 4 and the electrical connector 60 is connected to the positive terminal cover 74, the electrical connector 60 can extend through an opening O provided by the positive terminal cover 74. The opening O is between the positive terminal cover 74 and the busbar cover 70 in this example.

In the closed position, the positive terminal cover 74, as shown in FIG. 4, engages a portion of the interconnect board 50 to hold the positive terminal cover 74 in the closed position. In this example, a retention assembly 82 is used to engage the positive terminal cover 74 with the interconnect board 50. The retention assembly 82, in the exemplary embodiment, includes a first portion 86 of the positive terminal cover 74 that engages with a second portion 88 of the interconnect board 50 to hold the positive terminal cover 74 in the closed position. In this example, the first portion 86 is a half arrowhead tab, and the second portion 88 is a slot that receives a portion of the arrowhead tab when the retention assembly 82 is engaged.

To disengage the retention assembly 82, a user can push in a direction P against the positive terminal cover 74. This force can move the portion of the arrowhead tab out of the slot to enable rotation of the positive terminal cover 74 from the closed position to the open position.

Other retention assemblies are possible and fall within the scope of this disclosure. In another embodiment, for example, an arrowhead tab could extend from the interconnect board 50 to engage a slot within the positive terminal cover 74.

The positive terminal cover 74 include another retention assembly 90 that is used to hold the positive terminal cover 74 in the open position. Holding the positive terminal cover 74 in the open position can facilitate one-handed securing of the electrical connector 60 to the positive terminal 54.

The retention assembly 90 includes, in this example, a tab 92 extending from the positive terminal cover 74, and a hook 94 extending from the interconnect board 50. When the second retention assembly 90 is engaged, the hook 94 fits over the tab 92 to hold the positive terminal cover 74 in the open position as shown in FIG. 6.

To disengage the retention assembly 90, the user can flex the hook 94 away from the tab 92 in the direction F. This can clear the hook 94 from interfering with movement of the positive terminal cover 74 from the open position back to the closed position.

The negative terminal cover 76 can be similarly moved between open and closed positions. The negative terminal cover 76 can further include a retention assembly to hold the negative terminal cover 76 in the open position, and a retention assembly to hold the negative terminal cover in the closed position.

In this disclosure, like reference numerals designate like elements where appropriate, and reference numerals with the addition of one-hundred or multiples thereof designate modified elements. The modified elements incorporate the same features and benefits of the corresponding modified elements, expect where stated otherwise.

With reference now to FIGS. 7-11, another exemplary covering assembly 164 includes a busbar cover 170, a positive terminal cover 174, and a negative terminal cover 176 formed together as a single monolithic structure. The busbar cover 170 clips to an interconnect board 150 to cover the busbars 156. The positive terminal cover 174 and the negative terminal cover 176 each include a living hinge 178. The positive terminal cover 174 and the negative terminal cover 176 can each rotate back and forth between an open position and a closed position.

The positive terminal cover 174 includes a retention assembly 182 that holds positive terminal cover 174 in the closed position. The retention assembly 182 includes a hook 186 that fits beneath a lip 188 of the frames 146. To release the retention assembly 182, an operator can press in a direction P1 against the hook 186 to remove the hook 186 from beneath the lip 188. The positive terminal cover 174 can be moved to an open position by rotating the positive terminal cover 174 about the living hinge 178 to the open position of FIGS. 10 and 11.

Notably, in the example embodiment of FIGS. 7-11, the positive terminal cover 174 and the negative terminal cover 176 include portions that rotate between the open and closed positions about a respective axis that is aligned with a longitudinal axis $A_1$ of the battery array 44. This is in contrast to the positive terminal cover 74 and negative terminal cover 76 of the embodiment shown in FIGS. 2-6, which each rotate about a respective axis that is transverse to the longitudinal axis A.

Figure 11:
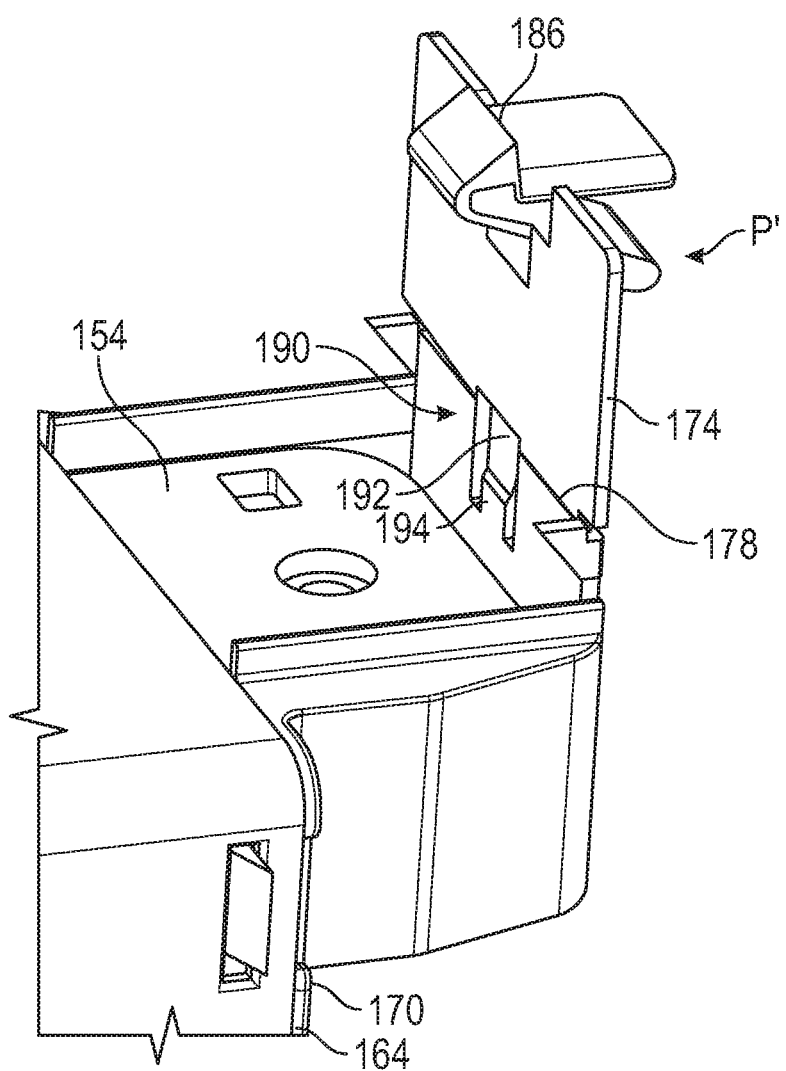
FIG. 11 illustrates another view of the terminal cover of FIG. 9 in an open position.

The positive terminal cover 174 includes a retention assembly 190 that holds the positive terminal cover 174 in the open position. The retention assembly 190 includes, in this example, a tab 192 extending from a first, lid portion of the positive terminal cover 174, and a tab 194 extending from a second, cup-shaped portion of the positive terminal cover 174. The tab 192 presses against the tab 194 when the first portion of the positive terminal cover 174 is rotated to the open position of FIGS. 10 and 11. The tab 192 rotation flexes the tab 194 until the tab 192 is able to rotate past the tab 194. After which, the contact between the tab 192 and the tab 194 blocks the first portion of the positive terminal cover 174 from falling back and rotating to a closed position, which gives an operator time to secure an electrical connector to the positive terminal 154. After the securing of the electrical connector, the operator can push the first portion of the positive terminal cover 174 in the direction V (FIG. 11). The force from the push rotates the tab 192 against the tab 194 until the tab 194 flexes enough for the tab 192 to rotate past the tab 194.

The negative terminal cover 176 is configured similarly to the positive terminal cover 176 to include a retention assembly that holds the negative terminal cover 176 in a closed position and a retention assembly that holds the negative terminal cover 176 in an open position.

The terminal covers in the exemplary embodiments are molded together with respective busbar covers. In both embodiments, this provides a singular, monolithic covering assembly that can be used to cover both busbars of a battery array and terminals of the battery array.

When a battery array is shipped, for example, to an assembly location where the battery array will be installed within an electrified vehicle, the terminal covers of the covering assemblies can be placed in the closed positions to protect the terminals.

When the battery arrays are installed within a vehicle, an operator can manipulate the terminal covers to move the terminal covers from the closed position to an open position. Respective electrical connectors can then be secured to the respective terminals of the battery arrays. The terminal covers are held in the open position to block the terminal covers from interfering with the securing of the electrical connectors. After the securing, the terminal covers can be moved back to the closed position to block access to the terminals and meet finger proofing requirements. The terminal cover can, for example, provide protection during shipping and assembly processes.

Although a specific component relationship is illustrated in the figures of this disclosure, the illustrations are not intended to limit this disclosure. In other words, the placement and orientation of the various components shown could vary within the scope of this disclosure. In addition, the various figures accompanying this disclosure are not necessarily to scale, and some features may be exaggerated or minimized to show certain details of a particular component.

The preceding description is exemplary rather than limiting in nature. Variations and modifications to the disclosed examples may become apparent to those skilled in the art that do not necessarily depart from the essence of this disclosure. Thus, the scope of legal protection given to this disclosure can only be determined by studying the following claims.

What is claimed is:

1. A covering assembly for a traction battery, comprising:
   a busbar cover that covers a busbar of a battery array; and
   a terminal cover connected to the busbar cover and moveable back and forth between a closed position and an open position, the terminal cover covering a terminal of the battery array when in the closed position, wherein the terminal cover is moveable between the closed position and the open position while the busbar cover is covering the busbar of the battery array.

2. The covering assembly of claim 1, further comprising a living hinge connecting the terminal cover to the busbar cover.

3. The covering assembly of claim 1, further comprising a retention assembly that holds the terminal cover in the closed position.

4. The covering assembly of claim 3, wherein the retention assembly includes a first portion on the terminal cover that engages a second portion on a frame of a battery cell to hold the terminal cover in the closed position.

5. The covering assembly of claim 3, wherein the retention assembly includes a first portion on the terminal cover that engages a second portion on an interconnect board to hold the terminal cover in the closed position.

6. The covering assembly of claim 1, further comprising a retention assembly that engages to hold the terminal cover in the open position, the retention assembly including a first portion on the terminal cover and a second portion on the busbar cover.

7. The covering assembly of claim 1, wherein the busbar cover and the terminal cover are portions of a single monolithic structure.

8. The covering assembly of claim 1, wherein the busbar cover and the terminal cover are portions of a covering assembly that is clipped to a battery array to cover portions of an interconnect board.

9. The covering assembly of claim 1, wherein the busbar cover is clipped to a battery array to hold the busbar cover in a position where the busbar cover covers the busbar.

10. The covering assembly of claim 1, further comprising an electrical connector that extends through an aperture between the terminal cover and the busbar cover when the terminal cover is in the closed position, the electrical connector electrically connecting the terminal of the battery array to a terminal of another battery array.

11. The covering assembly of claim 1, wherein the terminal cover is a first terminal cover and the terminal is a positive terminal, and further comprising a second terminal cover that is connected to the busbar cover and is moveable back and forth between a closed position and an open position, the second terminal cover covering a negative terminal of the battery array when in the closed position.

12. A covering assembly, comprising:
   a busbar cover that is secured to a battery array to cover at least one busbar;
   a plurality of battery cell terminals that are coupled to the at least one busbar;
   a positive terminal cover moveable back and forth between a closed position and an open position, the positive terminal cover covering a positive terminal of the battery array when in the closed position;
   a negative terminal cover moveable back and forth between a closed position and an open position, the negative terminal cover covering a negative terminal of the battery array when in the closed position; and
   a retention assembly that holds the positive terminal cover in the closed position, and another retention assembly that holds the positive terminal cover in the open position.

13. A terminal covering method, comprising:
   attaching a busbar cover to a battery array;
   electrically connecting an electrical connector to a terminal of the battery array; and moving a terminal cover from an open position to a closed position where the terminal cover covers the terminal, the busbar cover connected to the terminal cover; and moving the terminal cover by rotating the terminal cover about a living hinge that connects the terminal cover to the busbar cover.

14. The terminal covering method of claim 13, further comprising clipping the busbar cover to the battery array when attaching the busbar cover to the battery array.

15. The terminal covering method of claim 13, further comprising holding the terminal cover in the closed position using a retention assembly.

16. The terminal covering method of claim 15, wherein the retention assembly includes a first portion on the terminal cover that engages a second portion on a frame of a battery cell to hold the retention assembly in the closed position.

17. The terminal covering method of claim 15, further comprising holding the terminal cover in the open position using a first portion of the busbar cover that engages a second portion of the terminal cover.

* * * * *